3,326,381
ROTATABLE FILTERING UNIT
Forney Fuller, Jr., P.O. Box 12151,
New Orleans, La.
Filed Oct. 26, 1964, Ser. No. 406,316
18 Claims. (Cl. 210—330)

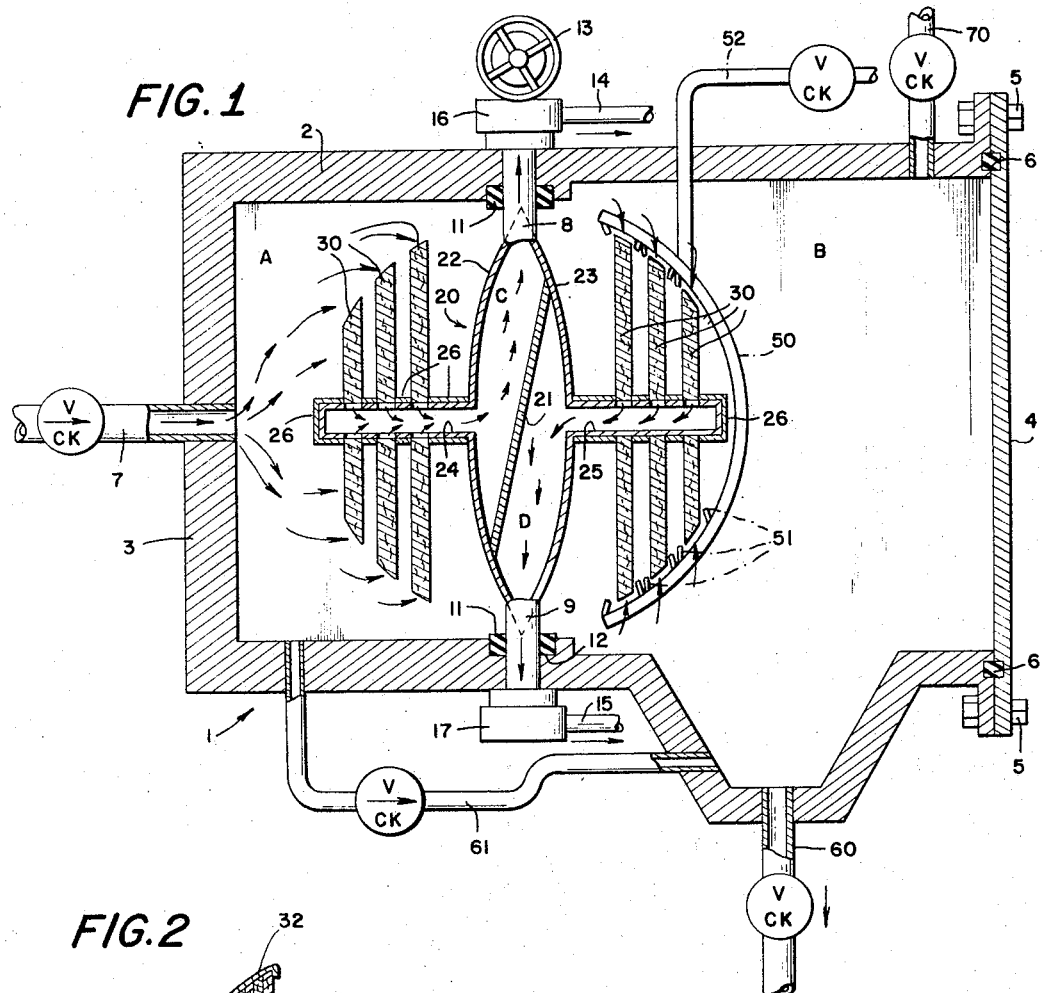
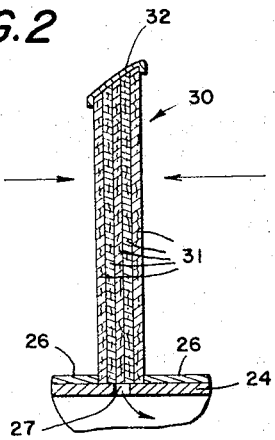
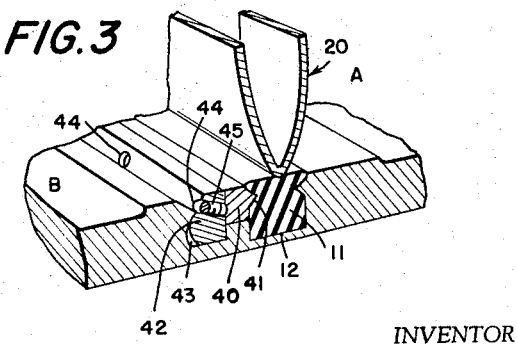
INVENTOR
FORNEY FULLER, JR.

This invention relates to an apparatus for treating fluids and more particularly to an apparatus advantageously adapted to be employed in the filtering and/or demineralization of water.

Numerous types of water filtering devices have been proposed in the prior art. Such previously available apparatus includes filtering equipment in which a portion thereof is designed to be operated on a filtering cycle while another portion is off-stream and being cleaned for re-use. Such filter equipment usually consists of a housing in the form of a tubular shell having disposed therein two filtering units or two series of filtering units attached for vertical movement along a line perpendicular to the axis of the shell. Baffles, flanges and the like are fixedly positioned within the shell and/or attached to the filter units so that upon the positioning of the filtering units in a vertically off-set arrangement, the interior of the shell is divided into two separate chambers, each one of which contains a filtering unit. A proper positioning of inlets and outlets to the shell allows fluid to be passed through one chamber wherein it is treated while the other chamber is emptied of fluid and can be opened for replacement, repair, etc., of the filter unit located therein.

While such previously available filtering apparatus is suitable for utilization in most respects, it suffers from the disadvantages of requiring, in many instances, separate means for effecting the desired movement of each of the filter units and requiring substantial uniformity in the construction and strength characteristics of the tubular shell over its entire length, particularly in cases wherein the fluid being treated by the unit is under a relatively high pressure. The former feature unsatisfactorily may increase the pressure drop characteristics of the apparatus and the adjustment time requirements of the overall unit; both features materially increase the overall cost of the equipment. Moreover, in cases wherein it is desired to make the treating unit substantially self-cleaning by disposing, within the tubular shell, means (e.g., spray nozzles) for cleaning the filter units when loaded or caked with filtering solids, the plurality of the filter unit moving means present often present problems to the proper relative positioning of the cleaning device with a sacrifice to the efficiency of the treating device.

Accordingly, it is the primary object of the present invention to provide an apparatus which is excellently adapted for treating fluids to effect a filtration, demineralization, and the like thereof.

It is an additional object of the present invention to provide an apparatus for treating fluids to effect solids removal, ion-exchange, and the like which is adapted for carrying out such treatments in a highly efficient manner as compared to apparatus of similar utility heretofore available.

It is another object of the present invention to provide an apparatus for filtering, demineralizing, etc., fluids having the feature that at least a portion thereof is adapted for effecting a continuous treatment of said fluids.

Another object of the present invention is to provide an apparatus for filtering fluids which is provided with a plurality of filtering units, at least a portion of which may be employed in a continuous treatment of said fluids while the remainder thereof easily and efficiently may be cleaned, repaired, replaced, and the like.

It is a further object of the present invention to provide an apparatus for filtering a fluid provided with a plurality of movable filter units which are intermittently employed in the filtering operation and adapted with a simple means for effecting the movement of said filter units which does not contribute to any appreciable extent to the pressure drop characteristics of the overall filtering device or provide an obstruction to the disposition of auxiliary equipment such as filtering unit cleaning devices adjacent said filtering units.

A particular object of the present invention is to provide a dual-chamber filtering apparatus adapted to effect a substantially continuous filtering, demineralization, etc., of fluid passed therethrough at relatively high pressures wherein the filtering units employed intermittently are cleaned, replaced, and/or repaired during said continuous filtering operation, with only a portion of said apparatus being required to be of such a construction to withstand the high fluid pressure of the fluid being treated.

Broadly described, the present invention provides an apparatus for treating fluids which comprises a housing having a circular cross-section, means positioned within said housing for dividing said housing into two non-communicating chambers, said housing-dividing means including a circular disc valve and a resilient annular valve seat for said disc valve, shaft means coinciding with a diameter of said housing for supporting said disc valve within said housing, means for activating rotation of said shaft means and said disc valve supported thereon, said disc valve being adapted to rotate through an angle of at least 180° about the axis of said shaft means from a position wherein the axis of said disc valve is perpendicular to a plane defined by a cross-section of said housing, at least one fluid filtering unit attached to said disc valve in spaced relation to the internal surface of said housing so not to interfere with rotation of said valve disc, fluid inlet means communicating the exterior of said housing with at least one of said chambers of said housing, fluid outlet means from said housing, and conduit means communicating with said fluid outlet means and the interior of said fluid filtering unit.

In accordance with the present invention, the fluid treating apparatus thereof is provided with a closed rigid housing having a circular cross-section which forms the main body of the present device. The shell suitably may be of a spheroidal, cylindrical and the like shape. Depending upon the operating conditions under which the apparatus is to be employed, the shell may be formed of fabricated material such as iron, steel and the like, unlined or lined on its inner surfaces with a protective material, such as a coating of an acid-resistant plastic, and constructed to withstand either relatively low or high internal fluid pressures. In certain embodiments of the present apparatus which are to be employed in the treatment of high pressure fluids, only a portion, i.e., one chamber, of the dual-chamber apparatus of the invention need be constructed to be adapted to withstand the high operating pressures. In such embodiments the high pressure side of the treating apparatus constituting the chamber formed by the stronger portion of the housing and the housing-dividing means provides the region through which the fluid being treated is passed, and the other chamber of the apparatus defined by the weaker portion of the housing and the housing-dividing means provides an area into which the filtering units employed intermittently may be moved from the high pressure chamber for cleaning, repairing, replacement, etc. Such a construction lowers the overall equipment investment expenditures and constitutes the preferred form of the present apparatus. The invention also does contemplate embodiments wherein the housing is so constructed that both chambers formed therein by the housing-divided means are adapted for high fluid pressures.

In accordance with the present invention the disc valve which is of the conventional "butterfly"-type valve is rigid and suitably may be a solid plate but preferably has a hollow interior and opposing concave faces. In embodiments wherein the interior of the disc valve is hollow, the interior preferably is divided by a fluid impermeable partition positioned therewithin into two regions which do not communicate with one another. Such a partition is relatively positioned such that at least one of the regions formed within the hollow disc valve is in communication with the fluid outlet from the housing and the interior of the filtering unit or units attached to the disc valve.

The disc valve is adapted to be disposed within the housing with the axis thereof perpendicular to a plane passing through the housing and defining a cross-section of the housing. The disc valve is pivotably supported within the housing by shaft means suitably journaled and extending into, and preferably through, the walls of said housing. Said shaft means coincides with a diameter of said housing. The shaft means suitably may be hollow shaft members which provide at least a portion of the conduit means communicating said fluid outlet means from the housing with the interior of the fluid filtering unit. Activating means, such as wheels, levers and the like operated manually or by an electric motor, linked as by cooperating threads, gears, etc., to said shaft means allows rotation of said disc valve through an angle of at least 180° about the axis of said shaft means from a position wherein the axis of said disc valve is perpendicular to the cross-section of the housing in which the axis of the shaft means lies.

The resilient annular valve seat for said disc valve suitably may be formed of any suitable material such as rubber and similar elastomeric materials and is positioned within the housing of the apparatus to engage the inner wall of the housing along its surface defined by its largest diameter and extend within the housing to engage the periphery of the disc valve along its surface defined by its smallest diameter when the disc valve is rotated into a position wherein the axis of the disc valve is perpendicular to a cross-section of the housing. The annular valve seat consequently is disposed to lie in a plane defining a cross-section of the housing and passing through the axis of said shaft means about which the disc valve is rotated. The annular valve seat is maintained in a fixed position with respect to lateral movement along the axis of the housing by suitable means such as being positioned between abutting flanges on the rims of separate sections of the housing wall or being located within a recess in the inner surface of a non-sectioned housing shell. The means maintaining the annular valve seat in position need not but may include at least one member which is adapted to be adjusted as to its position relative to the resilient valve seat to apply a greater or lesser squeezing force on the valve seat so that the thickness of the valve seat in the direction toward the axis of the disc valve and the pressure thereby exerted on the periphery of the disc valve may be varied. For example, in instances wherein the valve seat fastening means includes two abutting flanges formed on the ends of sections of the housing wall, means for locking the flanges together may be provided whereby the pressure exerted thereby on the annular valve seat and, consequently, the radial thickness of the valve seat may be varied. Such locking means suitably may be provided by a plurality of mutually cooperating threaded members, e.g., nuts and bolts, or by a locking device formed of two semicircular rings having a V-shaped cross-section in which said abutting flanges are positioned, said semicircular rings being hingeably connected together at one end, and a member, hingeably connected to the free end of one of the semicircular rings, which is adapted to be moved into locking engagement with notches and the like provided on the free end of the other of said semicircular rings to form a tensioned circular ring which squeezes the valve seat between said flanges and compresses it in a direction toward the axis of the housing and against the periphery of the disc valve.

In other embodiments of the apparatus of the invention wherein the valve seat is maintained in position within a recess provided in the inner surface of the housing, the desired thickness adjustment of the annular valve seat may be accomplished by forming at least a portion of one of the side walls of the recess from a rigid arcuate or ring member having a radial thickness less than that of said annular valve seat, and preferably having an abutting lip edge adjacent the valve seat, which member is adapted, such as by the use of set screws fitted therein and engaging the main wall of the housing, to be advanced in and out of tightening engagement with the valve seat and alter the pressure exerted by the valve seat on the periphery of the disc valve. By the use of such variable fastening means cooperating with the valve seat, embodiments of the apparatus of the invention having a particular design advantageously are adapted for efficient use over a relatively wider range of fluid pressures since the sealing effects provided by the valve seat may be varied.

In accordance with the invention, the filtering unit, and preferably a plurality of the filtering units, are attached to the disc valve in spaced relation to the inner wall of the housing so not to interfere with the rotation of the disc valve. The filtering unit or units suitably may be attached directly to and supported by the disc valve. In preferred embodiments of the invention at least a portion of the filtering units present are attached to the disc valve by means of one or more tubular conduit members which serve as support members for the units. A filtering unit so supported is connected to the tubular member with its interior in communication with the interior of the tubular member, and the tubular member is connected so as to provide a section of the conduit means communicating the filter unit with the fluid outlet from the housing. In the more preferred embodiments of the apparatus wherein the disc valve is hollow and the hollow interior is partitioned as described above, such a tubular support member is attached to the hollow disc valve in such a manner that the interior of the tubular support member and one region of the partitioned interior of the disc valve communicate with each other and with the fluid outlet from the housing.

Filter units suitably may be attached to one or both of the faces of the disc valve so as to extend into one or both of the two chambers formed within the housing when the disc valve is rotated into the positions wherein it engages the annular valve seat along its entire periphery, i.e., the two positions wherein the axis of the disc valve and the axis of the annular valve seat are in common. Preferably, filter units are attached to each of the two faces of the disc valve.

By means of such an arrangement, the disc valve can be rotated into a housing-dividing position and the filter units thereby disposed in one chamber of the apparatus can be employed to treat fluid in the desired manner, while the filter units on the other side of the disc valve thereby disposed in the second chamber of the device can be cleaned, replaced and the like and readied for utilization or re-utilization in the operation. Thereafter when the filtering units which are "on-stream" become clogged, fouled, etc., and their efficiency decreases, the feed of fluid being treated by the device temporarily is interrupted, the disc valve is rotated through 180° to reverse the positions of the fresh and fouled sets of filter units, and the flow of fluid to the unit is restarted. While the fresh filtering units are "on-stream," the fouled units then can be cleaned or replaced. By repeating the rotation and switching of the sets of filtering units between the fluid treating and filter unit cleaning chambers of the apparatus, the fluid treating operation advantageously can be carried on essentially in a continuous manner.

In accordance with the present invention, the filter units contemplated to be employed suitably may be of any conventional design. The particular design of the filter units is not critical. For example, the filter units may be in the form of cartridges which have perforated metallic outside shells which serve as containers for masses (bulk or layers) of filtering material such as glass fibers, asbestos, diatomaceous earth and the like. In the preferred embodiments the filtering units employed consist of leaf filtering elements formed of at least two sheets, preferably circular sheets, of filter screen material, such as porous cellulose acetate and nylon filter sheets, joined together in sandwich fashion, e.g., by having a clamping ring element disposed about the peripheries thereof. In use the leaf filtering elements preferably are given a precoat consisting of a layer or layers on the surface thereof of powdered solid filtering aid material such as asbestos and/or diatomaceous earth.

In instances wherein it is desired to utilize the apparatus of the invention to demineralize a fluid such as water in addition to or instead of filtering same, the filtering units may be provided with suitable deposits of ion-exchange resins, preferably in the form of powders of the resins. In preferred embodiments of the invention provided with leaf filtering elements, such ion-exchange resin powder is present in the form of layers thereof deposited on the outside faces of the leaf elements. Deposits of the ion-exchange resin powder also may be disposed between the adjacent sheets of the filter screen material making up a leaf element.

In accordance with the present invention the apparatus may include means, positioned within the interior of the housing thereof, for cleaning fouled and caked filter units, particularly filter units of the leaf element-type. Such cleaning means suitably may include elements which effect the desired cleaning results by a scraping and/or washing, and the like technique. Such cleaning means preferably is disposed in a chamber of the dual-chambered shell of the apparatus, which is adapted to be placed out of communication with the fluid inlet to the housing. Particularly adapted for inclusion in the present apparatus is a filter unit cleaning means including a fluid spraying element, preferably a plurality of spray nozzles which are disposed and supported in the "off-stream" chamber of the apparatus, i.e., that chamber with which the inlet to the apparatus for the fluid being treated does not communicate (except optionally by a valved shunt conduit which connects the two chambers) when the disc valve is in a seated position, in such a manner not to be interfering with the rotation of the disc valve as the filter unit or units are rotated and swung from one chamber to another and vice versa, and to be adapted to direct fluid against the filter-cake bearing surfaces of a filter unit to wash same and effect a removal of the filter cake when the disc valve has been rotated into a housing-dividing seated position. In preferred embodiments of the apparatus the filter unit cleaning means includes a sufficient number of spray nozzles properly disposed so that the filtering surfaces of all of the filtering units present in the "off-stream" chamber, when the disc valve is rotated into a housing-dividing position, may be contacted and washed clean of filter cake with fluid sprayed therefrom. The cleaning means also usually includes a cleaning fluid feed conduit which is in common with and provides the support for all of the spray nozzles provided.

The apparatus of the invention, having been described above, will be more fully understood from the following description of the accompanying drawings in which:

FIGURE 1 is a schematic front view, partially in section, of an embodiment of the apparatus provided with a plurality of leaf filtering elements and spray means for cleaning said leaf filtering elements when caked;

FIGURE 2 is an enlarged view of one of the leaf filtering elements of FIGURE 1; and FIGURE 3 is a view of an adjustable assembly which may be employed in an embodiment of the apparatus of the invention such as shown in FIGURE 1 to loosen and tighten the valve seating means.

With reference to FIGURE 1, numeral 1 designates a housing formed of a cylindrical shell 2 closed at one end by a header 3 and closed at the open end opposite header 3 by a removable closure plate member 4 fastened to shell 2 by suitable means as by bolts 5. Positioned within the joint between shell 2 and closure plate member 4 is an annular gasket means 6 whereby a fluid-tight connection is established between these two members. Valved conduit 7 is located in header 3 and provides a fluid inlet to the interior of housing 1. A hollow circular disc valve 20 is positioned coaxially within housing 1 and engages about its perpihery a resilient annular valve seat 11, which valve seat is disposed within a recess 12 provided in the inner wall of housing 1. The sealing of disc valve 20 with valve seat 11 divides housing 1 into two non-communicating chambers A and B. The walls of housing 1 surrounding chamber A are constructed to withstand higher fluid pressures than those of chamber B. The hollow interior of disc valve 20 is divided into two non-communicating regions C and D by a partition 21 positioned therewithin.

Disc valve 20 is connected at points representing the terminals of a diameter thereof to shaft means supporting same in the form of conduits 8 and 9 which extend radially to the exterior of housing 1 through openings provided in valve seat 11 and the walls of housing 1. Conduit 8 is coupled by means of suitable cooperating threaded members to an axle (not shown) of a wheel 13 which is adapted upon the turning thereof to activate and effect a rotation of shaft conduits 8 and 9 and disc member 20 through an angle of 180° about an axis passing through conduits 8 and 9. Conduits 14 and 15 located outside of housing 1 communicate with shaft conduits 8 and 9, respectively, by suitable valve means (not shown) located in conduit headers 16 and 17, respectively, and therewith provide fluid outlets from the interior of housing 1.

Connected coaxially to the opposing faces 22 and 23 of disc valve 20 are filter unit support conduits 24 and 25 which communicate at one of their ends with regions C and D within disc valve 20, respectively, and are closed at their opposite ends. A plurality of filter units in the form of circular leaf filtering elements 30 is mounted and positioned on each filter unit support conduit 24 and 25 and supported thereby in spaced relationship with respect to one another by means of spacer elements 26 and the inner walls of housing 1. The diameter of circular leaf filtering elements 30 diminishes with increasing distance from disc valve 20 so leaf filtering elements 30 do not interfere with the movement of disc valve 20 when disc valve 20 is rotated. The interiors of leaf filter elements 30 communicate with the interiors of filter unit support conduits 24 and 25 by means of apertures 27 provided in such conduits (FIGURE 2).

In chamber B of housing 1 and displaced in spaced relationship with respect to the closed end of filter unit support conduit 25 is a fluid manifold 50 provided with a plurality of spray nozzles 51. Spray nozzles 51 are so positioned and directed that they are adapted upon the positioning of disc valve 20 in housing-dividing position, as shown, to direct an interlocking spray of cleaning fluid, usually water, against the correspondingly adjacent surfaces of leaf filtering elements 30, which surfaces are adjacent thereto but removed therefrom. The assembly of spray nozzles 51 and manifold 50 is relatively positioned within chamber B of housing 1 so not interfere with the movement of leaf filtering elements 30 when disc valve 20 is rotated. Cleaning fluid is introduced into manifold 50 by means of a valved conduit 52.

A valved conduit 60 located in the bottom of chamber B of housing 1 between closure member 4 and disc valve 20 provides an outlet for solids slurry and the like from housing 1. A valved conduit 61 is positioned to connect chambers A and B of housing 1.

With reference to FIGURE 2, each circular leaf filtering element 30 is composed of a plurality, preferably from about 3 to 5, of individual circular sheets of filter screen material 31, such as cellulose acetate and nylon filter sheets, joined together in sandwich fashion to form a unitary laminated structure. The sheets of screen material are held together by an annular clamping ring 32 positioned about their peripheries and providing a rim for the leaf filtering element.

With reference to FIGURE 3, a portion, i.e., the upper portion, of the wall of recess 12 on the chamber B side of housing 1 is formed of a valve seat retaining member in the form of ring 40 provided on its face adjacent valve seat 11 with a protrusion 41. Disposed adjacent retaining ring member 40 is a means in the form of an adjustment ring member 42 for adjusting the position of retaining ring member 40 with respect to valve seat 11. Adjustment ring member 42 is fitted in a slot 43 provided in the wall of housing 1 whereby it is precluded from moving in a direction away from valve seat 11. Adjustment member 42 is provided with threaded holes 44 therein in which are located set screws 45 which are adapted upon their advancement to engage valve seat retaining ring member 40 and depress it into a position wherein protrusion 41 thereon exerts a compressive force upon valve seat 11. Set screws 45 similarly are adapted upon their withdrawal from contact with retaining ring member 40 to remove the compression from valve seat 11 and cause valve seat 11 to become loosened from its gripping engagement on the periphery of disc valve 20.

In treating a fluid such as water to filter and demineralize it with the apparatus of FIGURE 1, the operation may be carried out as follows:

Starting with fresh leaf filtering elements 30 on both filter unit support conduits 24 and 25 and with valve seat retaining ring member 40 in a suitably tightened condition, valve disc 20 is rotated by means of a turning of wheel 13 into the position shown in FIGURE 1 wherein filter unit support conduit 24 extends toward header 3 coaxially of housing 1, whereby the interior of the housing 1 is divided into two non-communicating chambers (valved conduit 61 being closed normally), chamber A which is adapted to withstand relatively high pressures and chamber B which is adapted to relatively low pressures. With valved conduits 7 and 14 open dispersions of diatomaceous earth or asbestos powders and ion-exchange resin powder in water then separately or as one mixture are fed into the filtering apparatus through valved conduit 7. The powders are filtered out of the water and deposited as coatings on the surfaces of leaf filtering elements 30 in chamber A. The resultant filtered water passes through and out of chamber A of housing 1 by means of the path provided by the communication of the interiors of filtering elements 30 therein, support conduit 24, disc valve 20 (hollow region C) and shaft conduit 8 with outlet conduit 14. Raw water desired to be treated then is charged under high pressure to the device through valved conduit 7. Solids suspended in the raw water feed are filtered out therefrom by leaf filtering elements 30 and simultaneously the water is contacted with the ion-exchange resin powder on the filtering element surfaces and thereby treated for removal of undesired ions initially present. Filtered and softened water is recovered from housing 1 at conduit 14.

During the period in which the aforesaid operations are carried out, dispersions or a dispersion of powdered diatomaceous earth, asbestos, and the like filtering aid materials and ion-exchange resin powder in water also are charged under low pressure to chamber B of housing 1 through valved conduit 70. The dispersed powders are filtered out and deposited on the surfaces of leaf filtering units 30 mounted on support conduit 25. The filtered water passes through and out of chamber B by means of the communication of the interiors of leaf elements 30 therein, support conduit 25, disc valve 20 (hollow region D), and shaft conduit 9 with outlet conduit 15.

The raw water charge to the unit through inlet conduit 7 is continued until leaf filtering elements 30 in chamber A become overly caked with filtered solids and/or the ion-exchange resin is exhausted whereupon the valved conduit 7 is closed and the raw water feed interrupted. Wheel 13 then is appropriately turned to rotate disc valve 20 through 180° about the axis passing through shaft conduits 8 and 9. By means of this operation filter unit support conduit 25 carrying fresh leaf filtering elements 30 coated with filter aid and ion-exchange powders is placed coaxially within chamber A of housing 1 and the caked leaf filtering elements mounted on support conduit 24 are positioned in chamber B. The high pressure raw water feed to the unit then is restarted through inlet conduit 7 and filtered and softened water is recovered at outlet conduit 15, the communication of outlet conduit 15 with the leaf filtering units mounted on support conduit 25 being as described above and including hollow region D within disc valve 20.

While the leaf filtering elements on support conduit 25 are "on-stream" and being employed in chamber A to treat raw water, the caked filtering elements on support conduit 24 now in chamber B are sprayed and washed clean of solids on their surfaces by an interlocking spray of water directed from spray nozzles 51. Filter cake solids slurry thereby produced is removed from chamber B through solids outlet conduit 60. The sprayed and cleaned leaf filtering elements on support conduit 24 then are treated while in chamber B as described before with respect to chamber A with filter aid and ion-exchange resin powder water dispersions under low pressure to ready them for re-utilization, the filtered water from the powder dispersions being recovered at conduit 14.

When the leaf filtering elements mounted on support conduit 24 become clogged with filter cake in chamber A, disc valve 20 is rotated again through 180° and reseated as described to switch the fouled and fresh sets of filtering elements from chamber A to chamber B and vice versa. Raw water feed to chamber A then is restarted, and the filtering operation as described then is repeated through as many cycles as desired with chamber A being employed as the chamber for treating the high pressure raw water and chamber B being used to clean and regenerate fouled and caked filtering elements. At times when it becomes necessary to replace or repair a filtering element, the worn filter element can be rotated into chamber B, and chamber B of housing 1 may be opened by removing closure member 4 to gain access to the unit.

By opening valved conduit 61 which connects chamber A and chamber B of housing 1 and closing conduits 52, 60, and 70, embodiments may be practiced wherein leaf filtering elements on both support conduits 24 and 25 are employed to treat raw water fed the unit through inlet conduit 7. In such instances filtered and softened effluent water is obtained at both outlet conduits 14 and 15. Such an operation increases the capacity of a given filtering unit for certain "on-stream" time intervals, but sacrifices continuity of operation.

What is claimed is:
1. An apparatus for treating fluids which comprises a housing having a circular cross-section, means positioned within said housing for dividing said housing into two non-communicating chambers, said housing-dividing means including a circular disc valve and a resilient annular valve seat for said disc valve, shaft means parallel to a diameter of said housing for supporting said disc valve within said housing, means for activating rotation of said shaft means and said disc valve supported thereon, said disc valve being adapted to rotate through an angle of at least

180° about the axis of said shaft means from a position wherein the axis of said disc valve is perpendicular to a plane defined by a cross-section of said housing, at least one porous-wall type fluid filtering unit attached to said disc valve in spaced relation to the internal surface of said housing so not to interfere with rotation of said valve disc, fluid inlet means communicating the exterior of said housing with at least one of said chambers of said housing, fluid outlet means from said housing, and conduit means communicating with said fluid outlet means and the interior of said fluid filtering unit.

2. The apparatus according to claim 1 wherein said disc valve has a hollow interior at least a region of which is in communication with said fluid outlet means from said housing and said interior of said filtering unit.

3. The apparatus according to claim 1 wherein at least a portion of said conduit means communicating said fluid outlet means with said interior of said filtering unit is a tubular member which is connected to said disc valve, said tubular member providing support for said filtering unit in spaced relation from the inner walls of said housing throughout said angle of rotation of said disc valve.

4. The apparatus according to claim 3 wherein a plurality of said filtering units are present and are positioned on said tubular member in spaced relation to one another.

5. The apparatus according to claim 4 wherein said filtering units are leaf filtering elements.

6. The apparatus according to claim 1 wherein said fluid inlet means communicates only with one of said two chambers in said housing and means for cleaning said filtering unit is positioned within said housing in the other of said two chambers of said housing in a manner not to interfere with said disc valve throughout said angle of rotation of said disc valve, and outlet means for filtered solids is provided in said chamber in which said filtering unit cleaning means is disposed.

7. The apparatus according to claim 6 wherein said filtering unit cleaning means includes a fluid spraying element disposed to direct a stream of cleaning fluid upon the surface of said filtering unit.

8. The apparatus according to claim 1 wherein at least one fluid filtering unit is attached to each of the two sides of said disc valve, two fluid outlet means from said housing are provided, a separate first conduit means is provided for communicating with the interior of the filtering unit on one side of said disc valve with one of said two fluid outlet means, and a separate second conduit means is provided for communicating with the interior of the filtering unit on the other side of said disc valve with the other of said two fluid outlet means.

9. The apparatus according to claim 8 wherein said disc valve has a hollow interior which is divided into two noncommunicating regions by a partition located within said hollow disc valve, one of said two regions of said hollow disc valve being in communication with the interior of the filtering unit on one side of said disc valve and one of said two fluid outlet means, and the other of said regions of said hollow disc valve being in communication with the interior of the filtering unit on the other side of said disc valve and the other of said two fluid outlet means.

10. The apparatus according to claim 8 wherein at least a portion of said conduit means communicating a fluid outlet means with the interior of a filtering unit is a tubular member which is connected to said disc valve, said tubular member providing support for said filtering unit in spaced relation from the inner walls of said housing throughout said angle of rotation of said disc valve.

11. The apparatus according to claim 10 wherein a plurality of said filtering units are present and are positioned on said tubular member in spaced relation to one another.

12. The apparatus according to claim 11 wherein said filtering units are leaf filtering elements.

13. The apparatus according to claim 8 wherein said fluid inlet means communicates only with one of said two chambers in said housing and means for cleaning a filtering unit attached to one of said sides of said disc valve is positioned within said housing in the other of said two chambers of said housing in a manner not to interfere with said disc valve throughout said angle of rotation of said disc valve, and outlet means for filtered solids is provided in said chamber in which said filtering unit cleaning means is disposed.

14. The apparatus according to claim 13 wherein said filtering unit cleaning means includes a fluid spraying element disposed to direct a stream of cleaning fluid upon the surface of said filtering unit attached to one of said sides of said disc valve.

15. The apparatus according to claim 9 wherein at least a portion of said conduit means communicating a fluid outlet means with the interior of a filtering unit is a tubular member which is connected to said disc valve, said tubular member providing support for said filtering unit in spaced relation from the inner walls of said housing throughout said angle of rotation of said disc valve.

16. The apparatus according to claim 15 wherein a plurality of said filtering units are present and are positioned on said tubular member in spaced relation to one another.

17. The apparatus according to claim 16 wherein said filtering units are leaf filtering elements.

18. The apparatus according to claim 17 wherein said fluid inlet means communicates only with one of said two chambers in said housing and means including a fluid spraying element for cleaning a filtering unit attached to one of said sides is positioned within said housing in the other of said two chambers of said housing in a manner not to interfere with said disc valve throughout said angle of rotation of said disc valve, and outlet means for filtered solids is provided in said chamber in which said filtering unit cleaning means is disposed.

References Cited
UNITED STATES PATENTS

| 2,250,693 | 7/1941 | York et al. | 210—330 |
| 2,799,397 | 7/1957 | Berline | 210—332 |

REUBEN FRIEDMAN, *Primary Examiner.*

W. S. BRADBURY, *Assistant Examiner.*